US008914302B2

(12) United States Patent  
Rose et al.

(10) Patent No.: US 8,914,302 B2
(45) Date of Patent: Dec. 16, 2014

(54) MOBILE COMMERCE AUTHENTICATION AND AUTHORIZATION SYSTEM

(75) Inventors: Gregory G. Rose, San Diego, CA (US); Craig B. Lauer, Poway, CA (US); Alexander Gantman, Poway, CA (US); Joan T. Waltman, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/472,093

(22) Filed: May 15, 2012

(65) Prior Publication Data

US 2012/0239576 A1    Sep. 20, 2012

Related U.S. Application Data

(63) Continuation of application No. 12/194,844, filed on Aug. 20, 2008.

(60) Provisional application No. 61/023,316, filed on Jan. 24, 2008.

(51) Int. Cl.
*G06Q 20/00* (2012.01)
*G06Q 20/40* (2012.01)
(Continued)

(52) U.S. Cl.
CPC .............. *G06Q 20/40* (2013.01); *G06Q 20/02* (2013.01); *G06Q 20/04* (2013.01); *G06Q 20/20* (2013.01); *G06Q 20/202* (2013.01); *G06Q 20/204* (2013.01); *G06Q 20/206* (2013.01); *G06Q 20/32* (2013.01); *G06Q 20/3224* (2013.01); *G06Q 20/325* (2013.01); *G06Q 20/3278* (2013.01); *G06Q 20/425* (2013.01); *G06Q 30/00* (2013.01); *G06Q 30/0601* (2013.01)
USPC ............. 705/17; 705/1.1; 705/14.64; 705/16; 705/18; 705/21

(58) Field of Classification Search
None
See application file for complete search history.

(56) References Cited

U.S. PATENT DOCUMENTS

| 5,208,446 A | 5/1993 | Martinez |
| 5,221,838 A | 6/1993 | Gutman et al. |

(Continued)

FOREIGN PATENT DOCUMENTS

| CN | 1381008 A | 11/2002 |
| CN | 1653472 A | 8/2005 |

(Continued)

OTHER PUBLICATIONS

International Search Report and Written Opinion—PCT/US09/031673, International Searching Authority, US, Alexandria, VA, Jun. 12, 2009.

(Continued)

*Primary Examiner* — Fateh Obaid
(74) *Attorney, Agent, or Firm* — Nicholas A. Cole (57) ABSTRACT

The mobile commerce authentication and authorization system allows a user of a currently existing mobile wireless communications instrument to conduct financial transactions, including purchases, across a wireless communications system using location data to authorize and authenticate the user and the transaction. The location of the mobile wireless communications instrument and the location of a vendor point-of-sale device are matched with a payment sum. Authentication of the mobile wireless communications instrument user is achieved at least by application of the position and/or location determinable features of the mobile wireless communications instrument, the position and/or location of a point-of-sale device of a vendor or merchant where the instrument user seeks to purchase goods or services, and the payment sum entered on the point-of-sale device. A transaction matching subsystem located in a wireless customer server hub may assist in processing the location data and the payment sum across the wireless communications network.

21 Claims, 5 Drawing Sheets

(51) Int. Cl.
   *G06Q 20/02* (2012.01)
   *G06Q 20/04* (2012.01)
   *G06Q 20/20* (2012.01)
   *G06Q 20/32* (2012.01)
   *G06Q 20/42* (2012.01)
   *G06Q 30/00* (2012.01)
   *G06Q 30/06* (2012.01)

(56) References Cited

U.S. PATENT DOCUMENTS

| | | | |
|---|---|---|---|
| 5,387,784 A | 2/1995 | Sarradin | |
| 6,157,826 A | 12/2000 | Lee | |
| 6,279,112 B1 | 8/2001 | O'toole, Jr. et al. | |
| 6,650,902 B1* | 11/2003 | Richton | 455/456.3 |
| 6,681,328 B1 | 1/2004 | Harris et al. | |
| 6,920,330 B2 | 7/2005 | Caronni et al. | |
| 6,965,914 B2 | 11/2005 | Dowling | |
| 7,013,391 B2* | 3/2006 | Herle et al. | 713/182 |
| 7,076,458 B2 | 7/2006 | Lawlor et al. | |
| 7,221,949 B2 | 5/2007 | Clough | |
| 7,222,154 B2 | 5/2007 | Dowling | |
| 7,337,229 B2* | 2/2008 | Dutta et al. | 709/229 |
| 7,853,534 B2 | 12/2010 | Su | |
| 8,566,233 B2* | 10/2013 | Prakash et al. | 705/39 |
| 2002/0052852 A1* | 5/2002 | Bozeman | 705/64 |
| 2002/0108062 A1 | 8/2002 | Nakajima et al. | |
| 2005/0075985 A1* | 4/2005 | Cartmell | 705/67 |
| 2005/0137975 A1* | 6/2005 | Williams | 705/40 |
| 2005/0177442 A1 | 8/2005 | Sullivan et al. | |
| 2005/0222949 A1* | 10/2005 | Inotay et al. | 705/40 |
| 2006/0069721 A1 | 3/2006 | Dowling | |
| 2006/0069722 A1 | 3/2006 | Dowling | |
| 2006/0237531 A1* | 10/2006 | Heffez et al. | 235/382 |
| 2007/0109262 A1* | 5/2007 | Oshima et al. | 345/156 |
| 2007/0194110 A1* | 8/2007 | Esplin et al. | 235/383 |
| 2007/0194113 A1* | 8/2007 | Esplin et al. | 235/383 |
| 2007/0232272 A1* | 10/2007 | Gonsalves et al. | 455/412.1 |
| 2007/0244811 A1* | 10/2007 | Tumminaro | 705/39 |
| 2008/0207128 A1 | 8/2008 | Mikko | |
| 2009/0018924 A1 | 1/2009 | Roberts | 705/21 |
| 2009/0102712 A1* | 4/2009 | Heffez | 342/357.06 |
| 2009/0290540 A1* | 11/2009 | Cherian et al. | 370/328 |
| 2010/0049615 A1* | 2/2010 | Rose et al. | 705/17 |
| 2011/0078025 A1* | 3/2011 | Shrivastav | 705/14.64 |
| 2011/0251892 A1 | 10/2011 | Laracey | |
| 2012/0160912 A1 | 6/2012 | Laracey | |
| 2013/0013433 A1 | 1/2013 | Rose et al. | |

FOREIGN PATENT DOCUMENTS

| | | |
|---|---|---|
| JP | 2002183638 A | 6/2002 |
| JP | 2002352165 A | 12/2002 |
| JP | 2003150883 A | 5/2003 |
| KR | 20040078954 A | 9/2004 |
| KR | 20080002835 | 1/2008 |

OTHER PUBLICATIONS

Supplementary European Search Report—EP09704282, Search Authority—The Hague Patent Office, Dec. 16, 2011-12-16.

* cited by examiner

MOBILE COMMERCE AUTHENTICATION AND AUTHORIZATION SYSTEM

CROSS-REFERENCE TO RELATED APPLICATION

This application claims priority under 35 U.S.C. §120 to and is a continuation of U.S. patent application Ser. No. 12/194,844, entitled "A MOBILE COMMERCE AUTHENTICATION AND AUTHORIZATION SYSTEM," filed Aug. 20, 2008, and assigned to the assignee of this application.

BACKGROUND

1. Field

The apparatus, system, and method described, illustrated, and claimed in this document relate generally to a mobile commerce authentication and authorization system. The system enables a user of an unmodified mobile wireless communications instrument (including, but not limited to, a mobile wireless cellular telephone) to conclude authenticated and authorized purchases, and other commercial transactions, across a wireless communications system. The system also automatically initiates a payment application as a consumer enters a business so that when the consumer is ready to depart the business and to pay for purchases of goods and/or services, the unmodified mobile wireless communications instrument is prepared to conclude the transaction by effecting payment.

The mobile wireless communications instrument is capable of allowing a consumer to anonymously effect payments across a credit network by charging a payment to one or more payment instruments of the user, or to conduct and conclude such commercial transactions using any payment system desired by a consumer and acceptable to a vendor or merchant. Anonymity is achieved by use of the location parameters for authentication and the relationship between the location parameters and a payment sum, thus obviating the need for conventional identification features such as a personal identification number, possession of a payment instrument, provision of a biometric identifier, or any comparable device or procedure.

2. Background

Merchants, vendors, credit card associations including VISA® and MasterCard® that act as gateways between a financial institution and an issuer for authorizing and funding purchases, and users of mobile wireless communications instruments, all desire to conduct and close purchases and sales quickly and expeditiously. At least one concern is security, including acceptable and proper authorization and authentication that gives a vendor and a customer confidence that a fraudulent transaction will not occur.

Current constructs for effecting consumer purchases across a credit network generally are limited to use of a payment instrument in connection with purchase. Currently, a consumer must have in possession a plastic payment instrument such as a credit card or debit card having a magnetic strip. Alternatively, "contactless" payment instruments may be used. At the point-of-sale a credit card reader, terminal, or similar point-of-sale payment device is provided that requires the consumer to successfully swipe a payment instrument through the point-of-sale device. Over time, repetitive use degrades the magnetic strip on the payment instrument, and the data embedded in the magnetic strip may become unreadable by a point-of-sale device for a variety of reasons. Degradation of the magnetic strip may cause payment rejection although the consumer may be the authentic owner of the payment instrument. Even in the case of contactless payment instruments, authentication or verification of the customer is limited to data and information embedded in the payment instrument. Whoever possesses the payment instrument can cause purchases. The use of personal identification numbers solves neither the problems of customer identification nor customer authorization. Even customer authentication fails to overcome problems resulting from lost or stolen payment instruments, degraded instruments, or loss of functionality between the payment instrument and point-of-sale payment devices.

There is a worldwide need, therefore, for a secure point-of-sale payment system that substantially automatically authenticates a customer and substantially automatically initiates a payment for sales and purchases of goods and services on entry of a consumer or customer into a business or into a geographic area surrounding a business that includes use of a portable, or mobile, wireless communication instrument now commonly in possession of consumers worldwide. At least one example of such a portable, or mobile, wireless communications instrument is a cellular telephone, but any wireless communications instrument to which a computer and/or data processing system may be operatively connected may be used.

Most proposed mobile commerce solutions for conducting purchases using a mobile wireless communications instrument such as a cellular telephone require the cellular telephone to be altered either structurally or systemically by adding hardware, software, and/or combinations of hardware and software. For example, although Near Field Communication ("NFC") offers solutions in this field, the mobile wireless communications instrument must be adapted to communicate with an NFC-adapted device. The only advantage of being integrated with a cellular telephone is that the user is, these days, likely to have a cellular telephone in possession of the user and/or customer. However, the need for major alterations of the mobile wireless communications instrument, and the infrastructure equipment to support the NFC-operable device, substantially reduce the likelihood of universality of use.

In addition, problems arise because consumers may lack intimate familiarity with all operational requirements for using a cellular telephone or other instrument to select menu entries, identify credit card information, enter vendor and/or merchant names, and so on. These problems may present issues analogous to a consumer calling a merchant and receiving a seemingly endless array of voice-activated options before the consumer may achieve what the consumer desires.

The mobile commerce authentication and authorization system of this document, however, advances the art and provides the technical advantages of not requiring a consumer or user to possess a payment instrument at the time of a transaction; or to know or recall information such as a password, a personal identification number, or personal details often forgotten; or to be someone identified by such characteristics as biometric fingerprints, appearance, or similar personal details.

Rather, the present system achieves authentication and authorization, and consequent trustworthiness, using at least two physical and/or location determinables, parameters that are combined to eliminate concern about further authentication and authorization. The two physical and location determinables include (a) one or more location parameters, namely the location of the mobile wireless communication instrument that may be determined at least using position-determinable data and systems, (b) the location of a point-to-sale device of a vendor and/or merchant, which in combination support the presumption that likelihood that the same payment sum requested for payment by the user of the mobile wireless communication instrument will not occur substantially simultaneously at any other point-of-sale device in a location at that time.

In addition, the apparatus, system, and methods disclosed, illustrated, and claimed in this document obviate paper receipts, and offer the prospect of substantially instant payment transactions across a credit network.

SUMMARY

The apparatus, system, and method disclosed in this document achieve the above-stated capabilities by including a mobile wireless communications instrument. A computer, or data processor, is operatively connected to the mobile wireless communications instrument. In one aspect, the data processor includes a plurality of user programmable sets of instruction executable by the data processor for selectively and securely conducting financial transactions using the mobile wireless communications instrument. The mobile commerce authentication and authorization system disclosed, illustrated, and claimed in this document is capable of allowing the user of a currently existing mobile wireless communications instrument to authenticate the user, and to have a purchase authorized, without structurally altering or systemically altering the instrument. Authentication is achieved at least by application of position and/or location determinable features of a mobile wireless communications instrument, the position and/or location of a point-of-sale device of a vendor or merchant where the instrument user seeks to purchase goods or services, and a payment sum entered on the point-of-sale device. One or more servers and other data processing components, in combination with communications transmission technologies, located in a wireless server hub (in this document, a "transaction matching subsystem"), assist in receiving, storing, processing, and/or transmitting the location parameters and a payment sum amount across the wireless communications network.

The mobile commerce authentication and authorization system disclosed, illustrated and claimed in this document is capable of both automatic and automated operability. For example, a user and/or consumer may enter into a mobile wireless communications instrument an instruction that is coordinated with SPS (as defined in this document) data that on entry into a specific store, or on entry into a peripheral area around the store, the mobile commerce authentication and authorization system automatically is activated for use by the consumer. While making selections of merchandise within the store, the mobile wireless communications instrument may inventory and total the merchandise selected by the consumer. Alternatively, after making selections of merchandise within the store, an agent of the store may confirm the payment sum due for the merchandise selected. In another aspect, after making selection of merchandise within the store, a point-of-sale device of the store may automatically confirm the payment sum due for the merchandise selected.

The consumer, who may be unknown to the agent of the store, is authenticated by location of the mobile wireless communications instrument. The payment sum entered into the point-of-sale device is authorized by location of the point-of-sale device and the store, as well as by the unique payment sum entered into the point-of-sale device. On approval of payment by the consumer, the transaction is concluded and closed.

Alternatively, in another aspect of the mobile commerce authentication and authorization system, the consumer may manually initiate the mobile commerce authentication and authorization system to implement the steps and results disclosed above. As a person skilled in the art will recognize, manual initiation of the mobile commerce authentication and authorization system may be accomplished by voice, by one or more depressions of keys, or by a wide variety of alternative means.

Another aspect of the mobile commerce authentication and authorization system of this document is the capability of expanding the system to include additional levels of authentication and/or authorization. Either a consumer, merchant, credit network, card association, and/or interchange, all as defined in this document, may desire additional levels of assurance and/or trust to effect a transaction. As one non-exclusive example, if a consumer is outside the customary geographic area in which the consumer lives and shops, the consumer may be required to provide one or more additional means of authentication such as a personal identification number.

In yet another aspect of the mobile commerce authentication and authorization system, the system is fully compatible with, and capable of being used over, one or more cooperative message-forwarding systems linking computer networks around the world, such as the Internet (collectively in this document, "Internet"). Again, no structural or systemic changes are necessary in the mobile wireless communications system to authenticate and authorize a sale and/or purchase over the Internet. A consumer, however, may want to impose location parameters of limitation on such authentication and authorization. For example, a consumer may want to limit sales and purchases if conducted from the consumer's home, whose location can readily be established by SPS location systems and data. Security is thus enhanced if the mobile wireless communications system is stolen: a person who finds or steals a cellular telephone, for example, is unlikely to attempt to conduct a sale and purchase transaction from the user's home.

DETAILED DESCRIPTION

Definitions

As used in this document, the term "unmodified" means a mobile wireless communications instrument not altered structurally or mechanically or systemically. Instead, the mobile commerce authentication and authorization system provides the conditions of trust and reliability desired to enable merchants, vendors, credit card associations such as VISA® and MasterCard®, issuers, and financial institutions to approve payment and to conclude and/or close financial transactions such as, but not limited to, purchase and sale transactions. In addition, the apparatus, system, and method described, illustrated, and claimed in this document do not require or rely on the existence or use of such conventional payment entities. Instead, the mobile commerce authentication and authorization system can conclude payments using any financial and/or payment system.

The terms "mobile wireless communications instrument" and "portable wireless communications instrument" as used in this document mean at least a wireless communication instrument used in a wireless communications system that, in general, includes an array of operatively connected communication devices adapted to receive and transmit at least electromagnetic signals across the system without cables using infrared light and radio signals, and also includes a telecommunications system in which electromagnetic waves, rather than some form of wire, carry the signal over all or part of the communication path. The mobile wireless communications instrument may also receive and transmit signals including, location parameters, from satellites, including satellites that are part of the Global Positioning System (GPS), Galileo, GLONASS, NAVSTAR, GNSS, a system that uses satellites from a combination of these systems, or any satellite positioning system subsequently developed (collectively referred to generally in this document as a Satellite Positioning System ("SPS"). As used in this document, an SPS also includes pseudolite (pseudo-satellite) systems. As a person skilled in the art will appreciate, however, the technology of all SPS systems is constantly being improved. New as yet unknown technologies for location determination and for determining location parameters of use with the mobile commerce authentication and authorization system of this document may be developed, may be used in connection with the mobile commerce authentication and authorization system of this document, and are included in the meaning of "SPS" as used in this document.

The term "instrument" in combination with the words "mobile wireless communications," means and includes at least a cellular telephone, a pager, a satellite telephone, a two-way pager, a personal digital assistant ("PDA") having wireless capabilities, a portable computer having wireless capabilities, wireless local area networks, and any other type of wireless device having transmission capabilities that may also be one or more versions of a personal communications services device ("PCS") including time division multiple access ("TDMA"), a code division multiple access ("CDMA"), a global system for mobile ("GSM"), non-voice communications apparatus, and text transmission apparatus, among others. The term "instrument" is also intended to include devices which communicate with a personal navigation device ("PND"), such as by short-range wireless, infrared, wireless connection, or other connection, regardless of whether satellite signal reception, assistance data reception, and/or position-related processing occurs at the device or at the PND. Also, "instrument" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

The term "location" and "position" and "location-determinable" mean the physical and geographic location of a mobile wireless communications instrument and a vendor's point-of-sale device determined by any technique, technology, or system, or any combination of techniques, technologies, or systems, known or as yet unknown, for determining location parameters. Currently, such techniques and apparatus used for various wireless communication networks such as an SPS system in combination with a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. As a person skilled in the art will appreciate, other emerging technologies and networks are contemplated, including the Universal Mobile Telecommunications System (UMTS), also sometimes referred to as 3GSM technology, which is a third-generation (3G) technology already being developed as a fourth-generation (4G).

The term "match" means to compare at least location parameters with the goal of uniting the location parameters into an acceptable association of data to warrant both authentication and authorization sufficient to enable mobile commerce financial transactions, including payments.

The term "transaction parameters" includes at least location information and one or more payment sums in connection with a financial transaction.

The term "point-of-sale device" means at least a terminal or other device that may function like a cash register or similar device for recording sales. It may include peer-to-peer near field communications devices, ISO 14443-compliant contactless card, and ISO 18092-compliant FeliCa card among others. Thus, a point-of-sale device includes not only credit card and debit card readers that may include touch screens, and conventional cash registers, but also automatic and automated teller machines ("ATM's"), among others. The location of the point-of-sale device may be determined by any means of determining location parameters discussed in this document.

The term "credit network" means a national and/or worldwide system in which financial institutions, merchants, and public users are connectable. Credit networks were designed for use primarily with payment instruments. Payment instruments allow public users, or customers, to use, for example, a credit or debit card to purchase goods or services in substantially real time following authentication of the customer, authorization, and approval of the transaction by a financial institution. A user, or customer (in this document, either "user" or "customer"), is issued a payment instrument such as a credit or debit card after an account has been approved by the credit provider, often a financial institution such as a bank, with which the user is able to make purchases from merchants who accept the credit, up to a pre-established limit. In addition, a "card association" often is included in the credit network, and includes among others VISA® and MasterCard® which act as gateways between a financial institution and issuer for authorizing and funding transactions, the issuer being a financial institution or other organization that issued the credit/debit card to the cardholder.

The flow of information and money among the various parties across a credit network, almost always through card associations, is known as the "interchange." The interchange includes a number of steps. The first step is authorization, in which the cardholder pays for a purchase, and the merchant submits the transaction to a financial institution that verifies, almost instantly, that the card number and transaction amount both are valid, and then processes the transaction for the cardholder. Another step includes "batching," which is the step by which a transaction is authorized and then stored in a batch which the merchant sends to the financial institution for later payment. Another step includes clearing and settlement, which is when the financial institution sends the transactions in a batch through the card association which debits the issuers for payment and credits the financial institution. Finally, there is the step of funding. Once the financial institution has been paid, the merchant receives payment.

The term "payment instrument" means at least a credit card, a debit card, a contactless card, debit lines, debit coupons, and cash equivalents.

The term "financial transaction" means at least the use of financial data and financial information related to an exchange or transfer of goods, services or funds, generally based on contract, agreement, bargain and similar transactions.

The term "authentication" means to confirm, prove, and/or serve to prove that a person is who the person asserts the person is. The term "authorization" means legal and/or custom that empowers a person to act or omit to act. Authentication and authorization are achieved without altering existing mobile wireless communications instruments by instead relying on data concerning the position or location of (i) the mobile wireless communications instrument, and (ii) a vendor point-of-sale device (collectively, the "location parameters," individually a "location parameter"), and by (iii) establishing a relationship between the location parameters and a payment sum entered into the point-of-sale device by either the user of the mobile wireless communications instrument, or a person entering data into a point-of-sales device, or other means.

The term "approved" includes authenticated and authorized transactions.

The term "wireless communications network" means a wireless communications system adapted to communicate with one or more mobile wireless communications instruments, including not only the QUALCOMM® QSHOP™ system, but also any communications system capable of associating geographical location data with a mobile wireless communications instrument, a point-of-sale device in a merchant's store, and of transmitting between such geographic locations payment sums pertaining to a commercial transaction involving the sale and purchase of good and/or services, using SPS position-determination technology.

The term "payment sum" means not only the amount of a purchase sum or amount, in any vendor-acceptable currency, that the user desires to pay for the products or services of the vendor, but also any and all payment instructions in connection with the payment sum made as a result of a payment application.

The term "transaction matching subsystem" means a back-office subsystem of a wireless communications network including, but not limited to, the QUALCOMM Mobile Commerce Platform that includes QFLOW™.

The term "user" means a person or persons authorized to use the mobile wireless communications instrument and to access either a credit network to conduct and conclude payments in connection with one or more payment instruments, or one or more databases for storing, receiving and transmitting financial data.

The word "exemplary" is used herein to mean "serving as an example, instance, or illustration." Any aspect described in this document as "exemplary" is not necessarily to be construed as preferred or advantageous over other aspects.

DESCRIPTION

The apparatus, system, and methods described, illustrated, and claimed in this document relate generally to a mobile commerce authentication and authorization system. The system enables a user of an unmodified mobile wireless communications instrument, including, but not limited to, a mobile wireless cellular telephone, to conclude authenticated and authorized purchases, and other commercial transactions, across a wireless communications system.

As used in this document, the term "unmodified" means that the mobile wireless communications instrument need not be altered structurally or mechanically, or enhanced systemically, to create the conditions of trust and reliability desired to enable merchants, vendors, credit card associations such as VISA® and MasterCard®, issuers, and financial institutions to approve and conclude such transactions.

Authentication and authorization are achieved without altering existing mobile wireless communications instruments by, in one aspect, determining the location of (i) the mobile wireless communications instrument, (ii) the location of a vendor point-of-sale device, and (iii) establishing a relationship between the location parameters and a payment sum entered into the point-of-sale device either by the user of the mobile wireless communications instrument, or a person entering data into a point-of-sale device, or other means.

The mobile wireless communications instrument is capable of allowing a consumer to effect payments across a credit network anonymously by charging a payment to one or more payment instruments of the user, or by satisfying the requirements of any other payment system. The mobile wireless communications instrument is capable of allowing a consumer to anonymously effect payments across a credit network by charging a payment to one or more payment instruments of the user, or to conduct and conclude such commercial transactions using any payment system desired by a consumer and acceptable to a vendor or merchant. Anonymity is achieved by use of the location parameters for authentication and the relationship between the location parameters and a payment sum, thus obviating the need for conventional identification features such as a personal identification number, possession of a payment instrument, provision of a biometric identifier, or any comparable device or procedure. However, as a person skilled in the art will appreciate, the mobile commerce authentication and authorization system is fully capable of incorporating the use of such conventional identification features, and others not yet developed. Thus, for example, a user may be required by a vendor policy or carrier policy to enter a personal identification number ("PIN") using the mobile wireless communications instrument to further enhance the reliability of the authentication and authorization data provide by the mobile commerce authentication and authorization system of this document. Alternatively, the user may be required to enter additional information only for purchases exceeding a certain amount or other limitations. The mobile commerce authentication and authorization system is adaptable to include and process such additional requirements.

In another aspect of the mobile commerce authentication and authorization system, anonymity may be achieved by authenticating the location of the mobile wireless communications instrument, the location of the point-of-sale device, and establishing a relationship between those location parameters and a payment sum. Accordingly, neither use of a personal identification number, nor possession of a payment instrument, nor provision of a biometric identifier, nor any comparable device or procedure is required, although those means of identification may be advantageously used in connection with the mobile commerce authentication and authorization system of this document.

As indicated, in another aspect of the mobile commerce authentication and authorization system, the mobile commerce authentication and authorization system is capable of allowing a user of an unmodified mobile wireless communications instrument to conduct commercial transactions requiring a payment in exchange for purchase of goods or services by using any payment system desired by a user and acceptable to a vendor.

In yet another aspect, a transaction matching subsystem located in a wireless customer server hub may assist in processing the location data and the payment sum amount across the wireless communications network.

Figure 1:
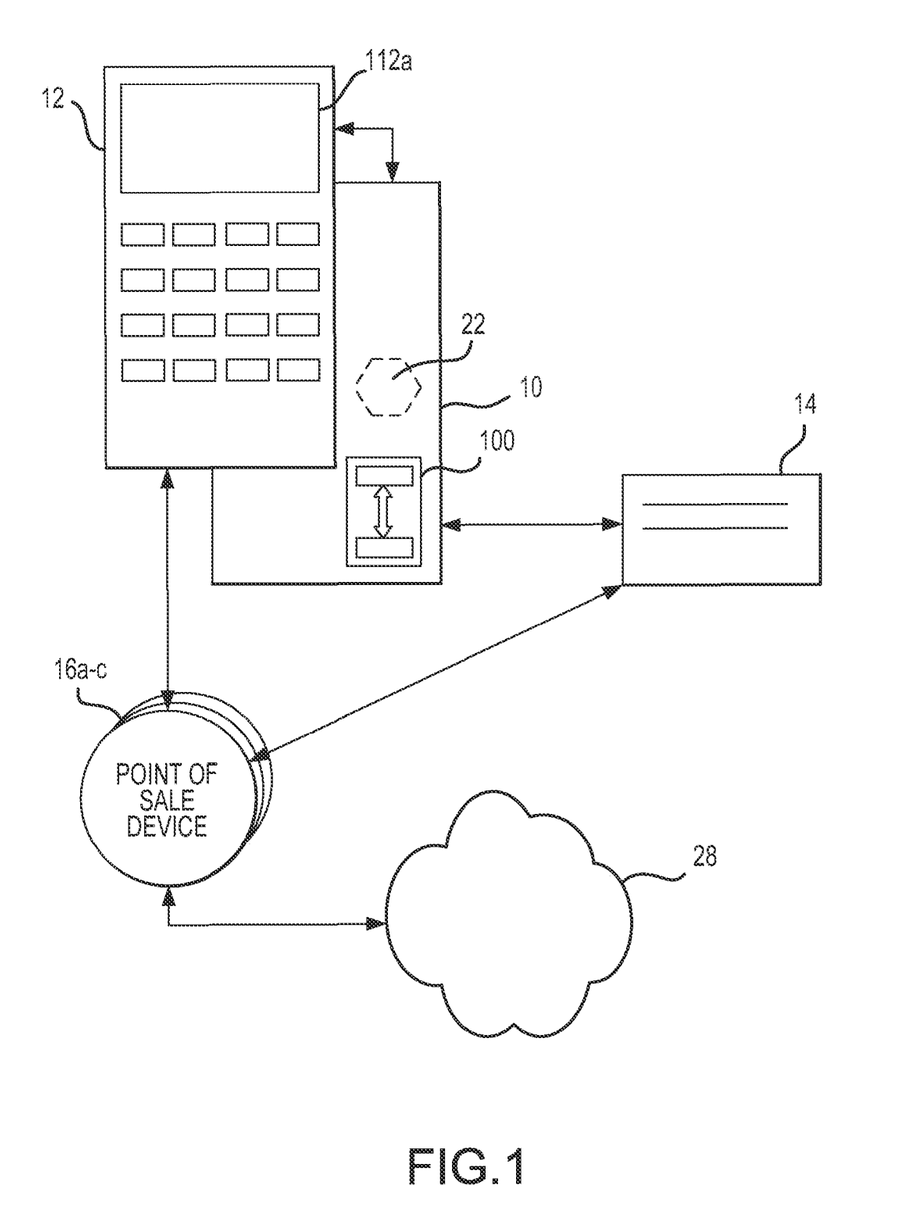
FIG. 1 is a schematic block diagram illustrating the point-of-sale device employing a mobile wireless communications instrument.

More specifically, in at least one aspect of the apparatus, system, and method disclosed, illustrated and claimed in this document, a mobile commerce authentication and authorization system 10 is provided that includes a portable, or mobile, wireless communications instrument 12, as illustrated schematically and diagrammatically in FIG. 1. The mobile wireless communications instrument 12 is selected from the group of mobile wireless communications instruments consisting of cellular telephones, communication apparatus providing personal communications services (PCS) including time division multiple access (TDMA), code division multiple access (CDMA), and global system for mobile (GSM), non-voice communication apparatus, text transmission apparatus, satellite telephones, two-way pagers, personal digital assistants, portable wireless computers, a wireless instrument specifically designed to implement financial data transactions, among others.

Figure 2:
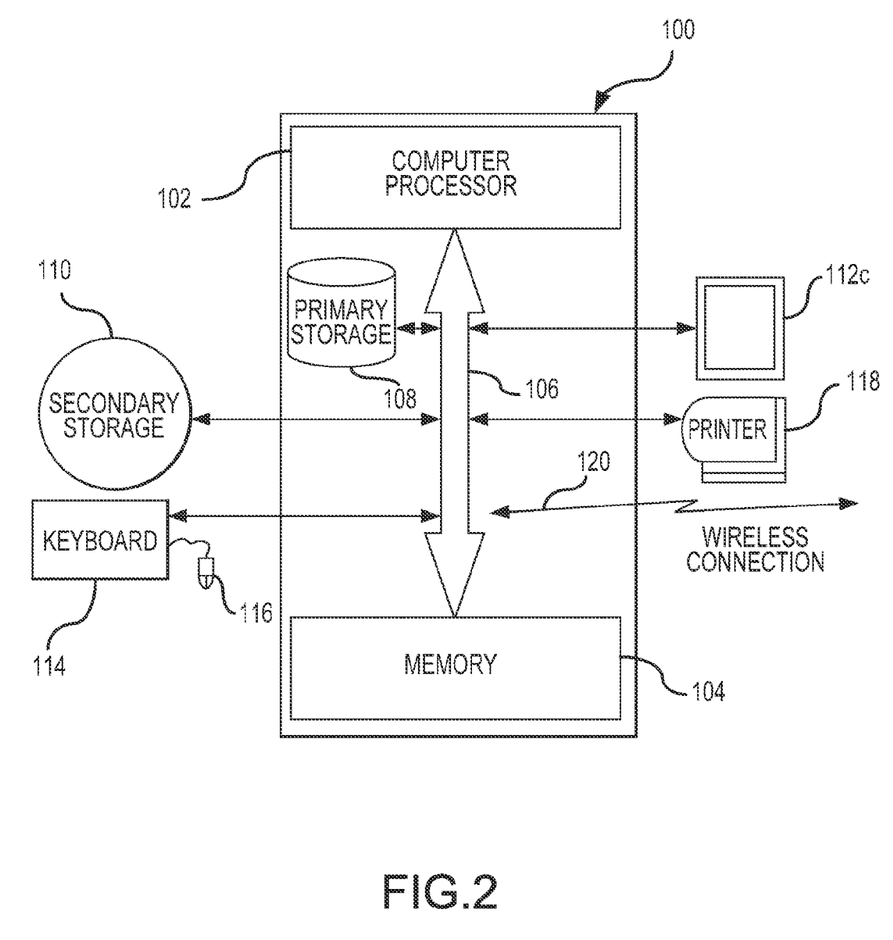
FIG. 2 is a schematic block diagram illustrating a version of the data processing system of the computer associated with the wireless communications instrument.

As also illustrated by cross-reference between FIGS. 1-2, the mobile commerce authentication and authorization system 10 also includes a computer and/or data processor 100. As shown, the data processing system 100 is operatively connected to the mobile wireless communications instrument 12. In one aspect, the data processing system 100 is housed in the wireless communications instrument 12. The data processing system 100 is adapted to transmit and receive programmable instructions in connection with one more payment instruments 14. In operation, any and all data electronically or otherwise embedded in and on the one or more payment instruments 14, as shown in FIG. 1, as well as any other data associated with a user and/or customer (collectively, in this document, "user"), a financial institution, and/or a card association, may be stored in the data processing system 100 of the mobile wireless communications instrument 12 for use as further described in this document.

Figure 3:
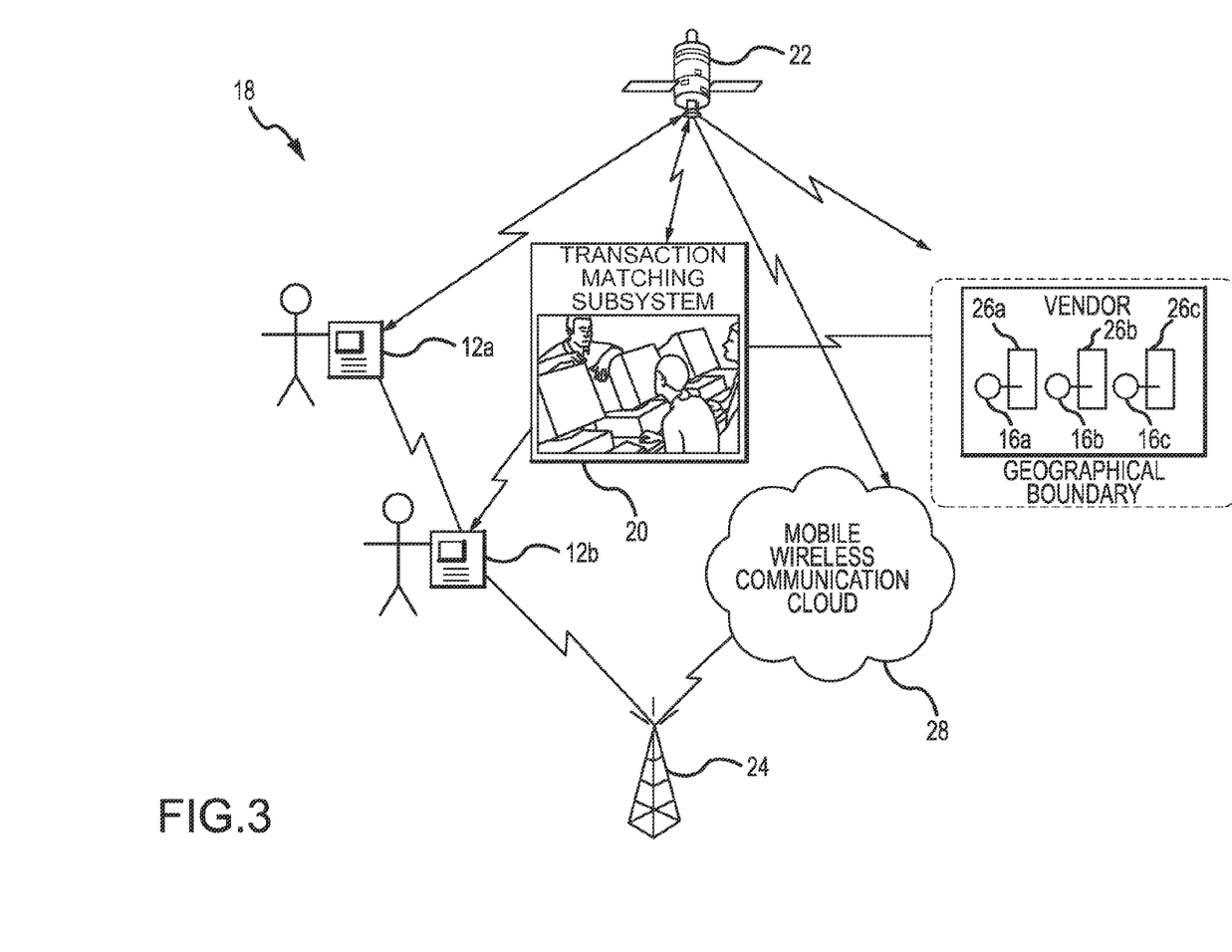
FIG. 3 is a block and diagrammatic illustration of an application of the mobile commerce authentication and authorization system.

The data processing system 100 of the mobile communications instrument 12 includes a number of optional features as illustrated in a non-exclusive example in the block diagram in FIG. 2. As shown, the data processing system 100 may include a variety of components to enable the mobile communications instrument 12 to send and receive data and information at least to one or more point-of-sale devices 16a-c, as well as across a mobile wireless communications system 18 as illustrated in FIG. 3. As shown, the data processing system 100 includes a computer processor 102, memory 104, the computer processor 102 and memory 104 connected by a bus 106. Memory 104 is a relatively high speed machine readable medium and may includes volatile memories such as DRAM, and SRAM, as well as non-volatile memories such as ROM, FLASH, EPROM, EEPROM, and bubble memory.

Also connectable to the bus 106 are optional secondary storage 108, external storage 110, output devices such as a first monitor 112a that may be mounted on the mobile wireless communications system 12, and in optional configurations an input device such as a keyboard 114 with a mouse 116, and perhaps even a printer 118. Secondary storage 108 may include machine-readable media such as a hard disk drive, a magnetic drum, and a bubble memory. External storage 110 may include machine-readable media such as a floppy disk, a removable hard drive, a magnetic tape, CS-ROM, and even other computers, possibly connected via a communications line 120. The distinction between secondary storage 108 and external storage 110 is primarily for convenience in describing the invention. As such, a person skilled in the art will appreciate that there is substantial functional overlap between and among the components. Computer software and user programs can be stored in a software storage medium such as memory 104, secondary storage 108, and external storage 110. Executable versions of computer software can be read from a storage medium such as non-volatile memory, loaded for execution directly into volatile memory, executed directly out of non-volatile memory, or stored on the secondary storage 108 prior to loading into volatile memory for execution.

In addition, those skilled in the art also will appreciate that the various illustrative logical blocks, modules, circuits, and algorithm steps described in connection with the aspects of the invention disclosed in this document may be implemented as electronic hardware, computer software, or combination of both. To clearly illustrate this interchangeability of hardware and software, various illustrative and non-exclusive components, blocks, modules, circuits, and steps have been described in this document generally in terms of their functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed in this document may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices such as, in a non-exclusive example, a combination of a DSP and a microprocessor, a plurality of microprocessors, one or more microprocessors in conjunction with a DSP core, or any other such configuration.

In another aspect of the mobile commerce authentication and authorization system 10 of this document, compatible near field communication instruments and devices may be used. As illustrated by cross-reference between FIGS. 1-3, the data processing system 100 of the wireless communications instrument 12 is capable of communicating data and information, including a purchase sum or amount, to the one or more point-of-sale devices 16a-c using, for example, a transaction matching subsystem 20, as shown in FIG. 3, or similar technology that responds to the location parameters.

The method and apparatus described in this document may be used in connection with various satellite positioning systems ("SPS"), such as the United States Global Positioning System ("GPS"), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites. As a person of skill in the art will appreciate, ground-based, or terrestrial, systems may also be used. Other means for discovering the location of the terminals such as triangulation, Time Delay of Arrival, and Assisted GPS may also be used. As an aid in describing the contributions to the art provided by the mobile commerce authentication and authorization system 10, an SPS system 22 is identified diagrammatically in FIG. 3, along with a terrestrial system 24.

As also illustrated in FIG. 3, the one or more point-of-sale devices 16a-c are shown mounted on cashier check-out counters 26a-c. The one or more point-of-sale devices 16a-c are operatively connectable, on demand, to the portable wireless communications instrument 12a,b. The point-of-sale devices 16a-c are adapted to receive and process payment data. The payment data may be received, stored, processed, executed and transmitted across the mobile wireless communications system 18. The mobile wireless communications system 18 may include use of the Internet for communicating across a mobile wireless communications cloud 28 as defined in this document. Accordingly, the point-of-sale devices 16a-c are adapted to receive and process payment data across a credit network that is included in the mobile wireless communications system 18 to which the point-of-sale devices 16a-c are operatively connectable. The location of the point-of-sale devices may be determined for purposes of the mobile commerce authentication and authorization system 10 by use of a location determination system such as SPS system 22. In another aspect, location of the point-of-sale devices may be determined by reference to the location of the store or other vendor in which the point-of-sale devices are located, including survey coordinates.

Figure 4:
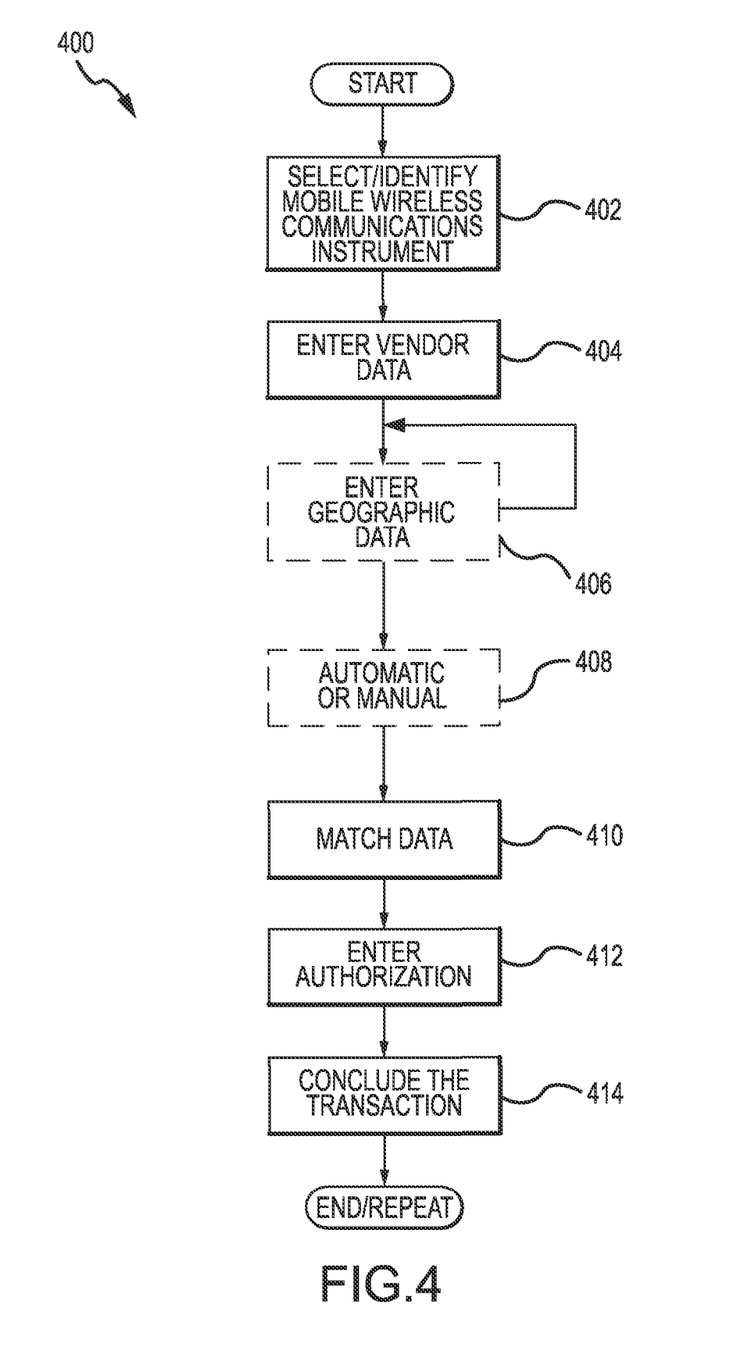
FIG. 4 is a flow chart illustrating one aspect of the mobile commerce authentication and authorization system.

In operation, therefore, as illustrated in FIG. 4, the mobile commerce authentication and authorization system 10 is summarized by a flowchart 400. At block 402 a mobile wireless communications instrument has been identified and selected for use by a user. In one aspect of the mobile commerce authentication and authorization system 10, the mobile wireless communications instrument is a cellular telephone of the kind now commonly in use worldwide. The cellular telephone is presumed to be equipped with the capability to communicate across the mobile wireless communications system 18, and to include SPS capabilities among its features. Neither the user, developer, nor manufacturer of the cellular telephone must modify such a cellular telephone to achieve the technical advantages of the mobile commerce authentication and authorization system 10 described in this document.

As also illustrated in FIG. 4, at block 404 the user may enter at any time data and information identifying a vendor, particularly a vendor with which the user has or intends to conduct more than one financial transaction such as sales and purchases. Such information identifying a vendor may include, as indicated by block 406, the name of a vendor. The name of the vendor may be specific, for example, a specific vendor at a specific location. The name of the vendor may also include the name for general application, for example, a supermarket chain regardless of the geographical location of the specific market. Alternatively, the information identifying a vendor may include geographical coordinates of a specific vendor with or without regard to the name of the vendor. In another aspect, the information identifying a vendor may include geographical coordinates of a geographical area in which the user conducts a number of financial transactions, for example, a shopping center in which the user may purchase coffee, shop for groceries, and purchase gasoline.

At block 408, when the predetermined geographical location data for a vendor has been met or satisfied as the cellular telephone enters the location of the vendor, a payment application may automatically be initiated. This achieves the advantage of expediting conclusion of a payment application by determining the cumulative payment sum for a transaction as the user proceeds toward a point-of-sale device to conclude the transaction. The automatic payment application feature of the mobile commerce authentication and authorization system 10 also achieves the additional advantage of contributing to authentication of the user and the consequent authorization of the transaction by the vendor. Alternatively, as also shown in block 408 the payment application process may be manually initiated by the user. The manual payment application feature of the mobile commerce authentication and authorization system 10 achieves the additional advantage of using the authentication and authorization steps to conduct a financial transaction when a vendor has not been predetermined and entered into the system. For example, a user may be traveling away from the user's customary area of commerce, and may want to conduct a financial transaction using the mobile commerce authentication and authorization system 10.

As indicated in FIG. 4 at block 410, the location data and the payment sum are matched by the mobile commerce authentication and authorization system 10. In one aspect, when a user is in the user's customary area of commerce, the predetermined location data of the vendor is compared with the location data of the cellular telephone, and the payment sum. Accordingly, at block 412 the user may enter an authorization for payment, or alternatively the system may request confirmation that the user is prepared to conduct and conclude the transaction, which is concluded at block 414. As a person skilled in the art will appreciate, the process enumerated in flowchart 400 may end or be repeated.

Figure 5:
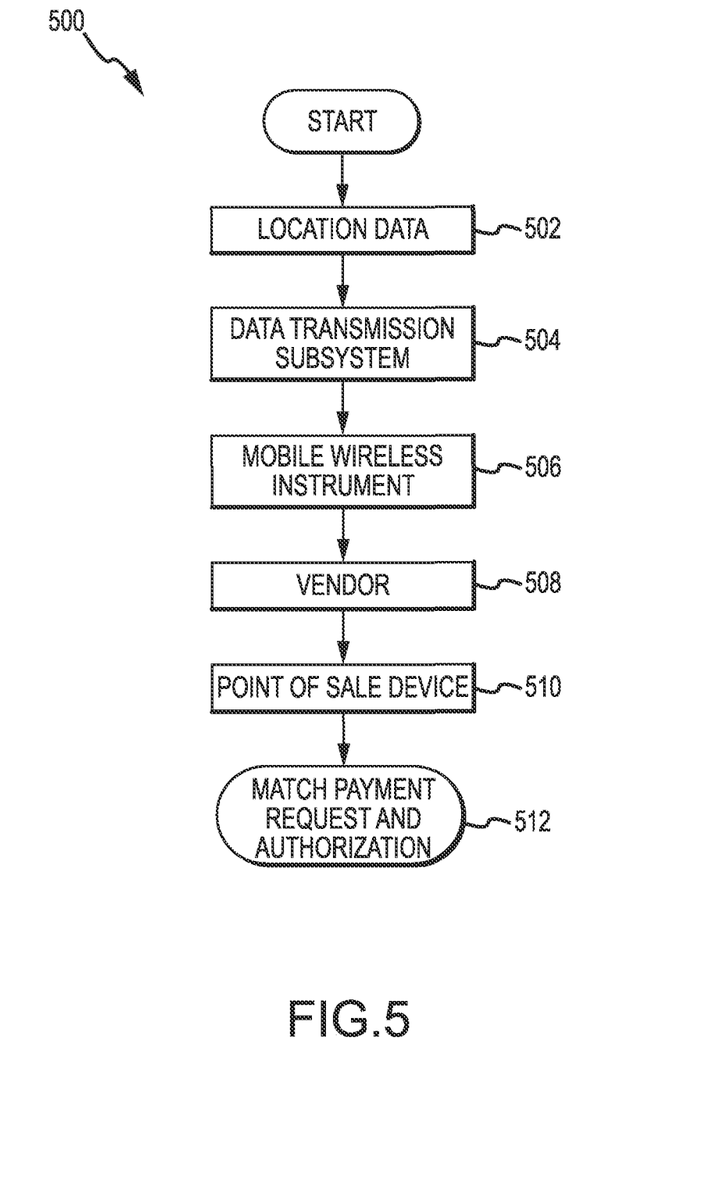
FIG. 5 is a flow chart illustrating another aspect of the mobile commerce authentication and authorization system.

A further illustration of the mobile commerce authentication and authorization system 10 is illustrated in FIG. 5 by flowchart 500. The process illustrated in FIG. 5 is as follows. At block 502 location data germane to the mobile commerce authentication and authorization system 10 has been obtained from the various location determination sources identified in this document. As indicated, the location data may be obtained from either an SPS system, including pseudo-satellite systems, or a terrestrial, or a combination of both. At block 504 the location data in connection with one or more wireless communication instruments and one or more vendors and one or more point-of-sale devices has been received and processed by the transaction matching subsystem. At block 506 the transaction matching subsystem has continued to monitor the location of the mobile wireless communications instrument as it moves from place to place. At block 508, the vendor may be a single vendor at a physical location, or may be any number of locations of a vendor by name. For example, the location of all stores bearing the name ABC may be tracked by the transaction matching subsystem in block 504. At block 510, at least one point-of-sale device either has been identified as to location, or has been presumed to be within the geographical location of the vendor in block 508. Accordingly, all of the location data for achieving authentication and authorization has been identified and assembled in order to effect the payment contemplated by the mobile commerce authentication and authorization system 10. Therefore, the transaction matching subsystem is prepared at block 512 to match the payment request and provide authorization based on the location data provided by the transaction matching subsystem in connection with the mobile commerce authentication and authorization system 10.

Those of skill in the art also would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosed aspects is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the aspects shown in this document, but is to be accorded the widest scope consistent with the principles and novel features disclosed herein.

What is claimed is:

1. A system for authenticating and authorizing a payment transaction, comprising:
a transaction matching subsystem configured to:
receive and process transaction parameters provided by a mobile wireless communications instrument, wherein the transaction parameters provided by the mobile wireless communications instrument include the geographical location of the mobile wireless communications instrument;
receive and process transaction parameters provided by a point-of-sale device, wherein the transaction parameters provided by the point-of-sale device include the geographical location of the point-of-sale device; and
authenticate and authorize the payment transaction, wherein the transaction parameters provided by the mobile wireless communications instrument further include a first payment sum;
the transaction parameters provided by the point-of-sale device further include a second payment sum;
the transaction matching subsystem is configured to authenticate and authorize the transaction based on a relationship between the geographical location of the mobile wireless communications instrument, the geographical location of the point-of-sale device, and the first and second payment sums;
at least one vendor point-of-sale device operatively connectable to the mobile wireless communications instrument and is adapted to provide the location of the at least one vendor point-of-sale device; and
an executable program operatively connected to the mobile wireless communications instrument and to the at least one vendor point-of-sale device for automatically initiating a payment application and for authorizing and authenticating the financial transaction resulting from a matching of the location of the mobile wireless communications instrument, the location of the at least one vendor point-of-sale device, and an amount of the payment from the payment application.

2. The system of claim 1, wherein the point-of-sale device is a near-field communication (NFC) point-of-sale device.

3. The system of claim 1, wherein the transaction parameters further comprise the geographical location of a geographical area in which one or more vendor locations are located.

4. The system of claim 1, further comprising:
a data processing system having logic operatively connected to the mobile wireless communications instrument adapted to at least one of receive, store, process, execute and transmit at least a first set of geographical location data and a payment sum across a wireless communications network.

5. The system of claim 4, further comprising:
a point-of-sale device operatively connectable to the mobile wireless communications instrument adapted to at least one of receive, store, process, execute and transmit a second set of geographical location data and a payment sum across the wireless communications network, wherein the transaction matching subsystem is located in a wireless customer server hub and adapted to process at least the first set of location data, the second set of location data, and to automatically initiate a payment sum across the wireless communications network.

6. The system of claim 4, wherein the logic of the data processing system is programmable to include at least the geographical location of vendors; or automatically initiate a payment application as the mobile wireless communications instrument enters a geographical area in which one or more vendor locations is located; or automatically initiate a payment application as the mobile wireless communications instrument enters one or more vendor locations described by the name of vendor; or manually initiate a payment application; or match and compare at least one of the first set of geographical location data, the second set of geographical location data, and a payment sum data that is authorized.

7. The system of claim 6, wherein the executable program is capable of manual initiation of a payment application resulting from a matching of the location of the mobile wireless communications instrument, the location of the at least one vendor point-of-sale device, and the amount of the payment from the payment application.

8. A computer-implemented method for authenticating and authorizing a payment transaction, comprising:

receiving and processing transaction parameters with a processor provided by a mobile wireless communications instrument, wherein the transaction parameters provided by the mobile wireless communications instrument include the geographical location of the mobile wireless communications instrument;

receiving and processing transaction parameters with a processor provided by a point-of-sale device, wherein the transaction parameters provided by the point-of-sale device include the geographical location of the point-of-sale device; and authenticating and authorizing the payment transaction with a processor, wherein the transaction parameters provided by the mobile wireless communications instrument further include a first payment sum; the transaction parameters provided by the point-of-sale device further include a second payment sum;

authenticating and authorizing the transaction with a processor based on a relationship between the geographical location of the mobile wireless communications instrument, the geographical location of the point-of-sale device, and the first and second payment sums;

coupling at least one vendor point-of-sale device to the mobile wireless communications instrument and providing the location of the at least one vendor point-of-sale device with a processor; and coupling an executable program to the mobile wireless communications instrument and to the at least one vendor point-of-sale device for automatically initiating a payment application and for authorizing and authenticating the financial transaction resulting from a matching of the location of the mobile wireless communications instrument, the location of the at least one vendor point-of-sale device, and an amount of the payment from the payment application.

9. The method of claim 8, wherein the point-of-sale device is a near-field communication (NFC) point-of-sale device.

10. The method of claim 8, wherein the transaction parameters further comprise the geographical location of a geographical area in which one or more vendor locations are located.

11. The method of claim 8, further comprising:
coupling a data processing system having logic to the mobile wireless communications instrument, the data processing system adapted to at least one of receive, store, process, execute and transmit at least a first set of geographical location data and a payment sum across a wireless communications network.

12. The method of claim 8, further comprising:
coupling a point-of-sale device to the mobile wireless communications instrument, the point-of-sale device adapted to at least one of receive, store, process, execute and transmit a second set of geographical location data and a payment sum across the wireless communications network, wherein the transaction matching occurs in a wireless customer server hub and adapted to process at least the first set of location data, the second set of location data, and to automatically initiate a payment sum across the wireless communications network.

13. The method of claim 12, wherein the wireless customer server hub is programmable to include at least the geographical location of vendors; or automatically initiates a payment application as the mobile wireless communications instrument enters a geographical area in which one or more vendor locations is located; or automatically initiates a payment application as the mobile wireless communications instrument enters one or more vendor locations described by the name of vendor; or manually initiates a payment application; or match and compare at least one of the first set of geographical location data, the second set of geographical location data, and a payment sum data that is authorized.

14. The method of claim 8, wherein the executable program manually initiates a payment application resulting from a matching of the location of the mobile wireless communications instrument, the location of the at least one vendor point-of-sale device, and the amount of the payment from the payment application.

15. A computer program product comprising a non-transitory computer usable medium having a computer readable program code embodied therein, said computer readable program code adapted to be executed to implement a method for authenticating and authorizing a payment transaction, said method comprising:

receiving and processing transaction parameters provided by a mobile wireless communications instrument, wherein the transaction parameters provided by the mobile wireless communications instrument include the geographical location of the mobile wireless communications instrument;

receiving and processing transaction parameters provided by a point-of-sale device, wherein the transaction parameters provided by the point-of-sale device include the geographical location of the point-of-sale device; and authenticating and authorizing the payment transaction, wherein the transaction parameters provided by the mobile wireless communications instrument further include a first payment sum; the transaction parameters provided by the point-of-sale device further include a second payment sum;

authenticating and authorizing the transaction based on a relationship between the geographical location of the mobile wireless communications instrument, the geographical location of the point-of-sale device, and the first and second payment sums;

coupling at least one vendor point-of-sale device to the mobile wireless communications instrument and providing the location of the at least one vendor point-of-sale device with a processor; and automatically initiating a payment application and for authorizing and authenticating the financial transaction resulting from a matching of the location of the mobile wireless communications instrument, the location of the at least one vendor point-of-sale device, and an amount of the payment from the payment application.

16. The computer program product of claim 15, wherein the point-of-sale device is a near-field communication (NFC) point-of-sale device.

17. The computer program product of claim 15, wherein the transaction parameters further comprise the geographical location of a geographical area in which one or more vendor locations are located.

18. The computer program product of claim 15, wherein the program code implementing the method further comprises coupling a data processing system having logic to the mobile wireless communications instrument, the data processing system adapted to at least one of receive, store, process, execute and transmit at least a first set of geographical location data and a payment sum across a wireless communications network.

19. The computer program product of claim 15, wherein the program code implementing the method further comprises coupling a point-of-sale device to the mobile wireless communications instrument, the point-of-sale device adapted to at least one of receive, store, process, execute and transmit a second set of geographical location data and a payment sum across the wireless communications network, wherein the transaction matching occurs in a wireless customer server hub and adapted to process at least the first set of location data, the second set of location data, and to automatically initiate a payment sum across the wireless communications network.

20. The computer program product of claim 19, wherein the wireless customer server hub is programmable to include at least the geographical location of vendors; or automatically initiates a payment application as the mobile wireless communications instrument enters a geographical area in which one or more vendor locations is located; or automatically initiates a payment application as the mobile wireless communications instrument enters one or more vendor locations described by the name of vendor; or manually initiates a payment application; or match and compare at least one of the first set of geographical location data, the second set of geographical location data, and a payment sum data that is authorized.

21. The computer program product of claim 15, wherein the program code implementing the method further comprises manually initiating a payment application resulting from a matching of the location of the mobile wireless communications instrument, the location of the at least one vendor point-of-sale device, and the amount of the payment from the payment application.

\* \* \* \* \*